United States Patent [19]

Casselman et al.

[11] Patent Number: 5,390,243
[45] Date of Patent: Feb. 14, 1995

[54] TELEMARKETING COMPLEX WITH AUTOMATIC THRESHOLD LEVELS

[75] Inventors: Brenda L. Casselman, Matawan; Robert A. Malmi, Middletown, both of N.J.; Bernadette M. Strout, Albany, Calif.

[73] Assignee: AT&T Corp., Murray Hill, N.J.

[21] Appl. No.: 146,662

[22] Filed: Nov. 1, 1993

[51] Int. Cl.⁶ .................... H04M 3/42; H04M 7/00; H04M 3/36
[52] U.S. Cl. .................................. 379/265; 379/112; 379/207
[58] Field of Search ............... 379/112, 221, 265, 266, 379/207, 309, 133, 220

[56] References Cited

U.S. PATENT DOCUMENTS

| | | | |
|---|---|---|---|
| 3,536,842 | 10/1970 | Ewin et al. | 379/221 X |
| 4,737,983 | 4/1988 | Frauenthal et al. | 379/265 X |
| 4,979,118 | 12/1990 | Kheradpir | 379/221 X |
| 5,025,468 | 6/1991 | Sikand et al. | 379/309 X |
| 5,164,983 | 11/1992 | Brown et al. | 379/265 |
| 5,291,552 | 3/1994 | Kerrigan et al. | 379/207 X |
| 5,299,259 | 3/1994 | Otto | 379/221 |

Primary Examiner—Thomas W. Brown
Assistant Examiner—Daniel S. Hunter

[57] ABSTRACT

A system for managing a telemarketing complex is disclosed wherein the probability of meeting a given performance objective by the agents servicing an automatic call distributor (ACD) within the complex is computed for each subinterval of a predetermined service interval. This probability is then compared with threshold levels in order to determine whether the ACD requires that calls be shifted to meet the performance objective or whether calls can be accepted by that ACD. A record is maintained for each subinterval of the probabilities computed for that subinterval and as to whether the system succeeded or failed in achieving the performance objective at the end of the service interval. This record is used to compute the threshold levels used in future comparisons. In addition, the system computes a line-estimation factor which when multiplied by the number of agents working can be used to estimate the call load for an ACD.

2 Claims, 5 Drawing Sheets

FIG. 5

HISTORICAL RECORD FOR THE THIRD SUBINTERVAL OF ACHIEVING SUCCESS AND FAILURE FOR SERVICE INTERVALS

| PROBABILITY | TIME (sec.) 360 - 540 | |
|---|---|---|
| | SUCCESS | FAILURE |
| 0 - 5% | | 1111 |
| 5 - 10% | 11 | 111 |
| 10 - 15% | 1 | 11111 |
| 15 - 20% | 111 | 11 |
| 20 - 25% | 1111 | 1111111 |
| 25 - 30% | 111 | 1 |
| 30 - 35% | 1111 | 11 |
| 35 - 40% | 111 | 1 |
| 40 - 45% | | 1 |
| 45 - 50% | 11 | 1 |
| 50 - 55% | 111 | 11 |
| 55 - 60% | 1111 | 1 |
| 60 - 65% | 1 | |
| 65 - 70% | 111 | 1 |
| 70 - 75% | 11 | |
| 75 - 80% | 11111 | 11 |
| 80 - 85% | 11 | 1 |
| 85 - 90% | 111 | |
| 90 - 95% | 1 | |
| 95 - 100% | 111 | |

TELEMARKETING COMPLEX WITH AUTOMATIC THRESHOLD LEVELS

BACKGROUND OF THE INVENTION

1. Field of the Invention

This invention relates to telemarketing complex performance management systems and more particularly to telemarketing complex performance management systems wherein threshold levels are set in order to determine when to reroute traffic so as to balance service levels among automatic call distributors or to implement changes in the staffing force at selected traffic centers where calls are received.

2. Description of Related Art

In a telemarketing complex performance management system (TCPMS), the telemarketing complex is managed by a system that compiles and processes data obtained from customer premises-based information sources as well as public switched telecommunications network-based information sources, such that service levels Can be balanced among telecommunications centers (TCs) in the complex. Typically, the telemarketing complex is comprised of a plurality of automatic call distributors (ACDs) and a plurality of data centers that may be selectively linked to the TCs where the telemarketer receives calls. The system typically includes the following elements: (1) an interface to the network that reports the origin and destination of each of a plurality of calls received by the telemarketer at all locations; (2) an interface to the network that enables the telemarketer to affect changes in call processing logic; and (3) a traffic control center processor (TCCP) that accepts input data from all other elements of the system. The system accumulates data at the TCCP from each ACD and telemarketer database located at a data center (PC), while contemporaneously monitoring both the origins and destinations of the plurality of calls received at each ACD as well as the initiation of changes in call processing logic. The system analyzes the data to generate signals for implementing call routing changes needed to balance service levels among the ACDs or changes in the staffing force levels at selected TCs where calls are received. The process is accomplished in real time and is repeated at a desired frequency.

In U.S. Pat. No. 5,164,983 issued Nov. 17, 1992 to P. B. Brown et al., a telemarketing complex performance management system (TCPMS) is described wherein the telemarketing customer is required to select a performance objective which is desired to be satisfied over a selected service interval. In the Brown et al. system, the performance objective is the average speed of answer (ASA) by the staff at a given ACD which is servicing an operation being performed by the telemarketing complex. A reactive process within the system determines the probability of meeting the performance objective ($P_s$) at that ACD for each subinterval within a service interval. This probability is then compared in the reactive process to two threshold levels, $T_{lo}$ and $T_{hi}$, both of which are also selected by the telemarketing customer. If the probability, $P_s$, is less than or equal to $T_{lo}$, an alarm condition is generated which suggests shifting calls away from the ACD under consideration in order to increase the probability of meeting the performance objective during the service interval. On the other hand, if the probability, $P_s$, is greater than or equal to $T_{hi}$, an accept condition exists which indicates that the ACD under consideration is lightly loaded and is capable of accepting traffic from other ACDs within the system. Of course, if the probability is between the two threshold levels, no alarm or accept condition is present and the reactive process does not suggest any alteration in the traffic routing patterns.

In the Brown et al. TCPHS system, the telemarketing customer can set a different value for the $T_{hi}$ and $T_{lo}$ threshold levels for each of the subintervals within the service interval at the end of which, he would like to achieve the selected value of the performance objective. Through trial and error, the customer can arrive at sets of threshold values that will achieve the desired switching of traffic throughout the many variations that occur in the incoming traffic due to seasonal, daily and monthly changes in the calling customers of the telemarketer.

SUMMARY OF THE INVENTION

An improved telemarketing complex performance management system is achieved in accordance with the present invention wherein the threshold levels which are used to determine whether calls should be shifted from or accepted by a given automatic call distributor are automatically set in accordance with the telemarketer's selection as to what percentage of false alarms or false accepts he or she is willing to accept. Specifically, the calculated value for the probability of successfully achieving the performance objective, $P_s$, is saved for each of the subintervals within the service interval. At the end of the service interval, an indication of success or failure in achieving the performance objective is entered in a memory table of probabilities for each of the subintervals within the service interval. Each subinterval has its own memory table and the indication of either success or failure is entered into that table within a range of probabilities that includes the probability of success calculated for that subinterval. The historical record of successes and failures is maintained in each subinterval table for a predetermined number of previous intervals. Using the table for a subinterval, a calculation is then made for $T_{lo}$ based on the percentage of false alarms that the telemarketer is willing to accept. An alarm is generated when the system calculates that calls must be shifted away from an ACD otherwise the agents servicing that ACD are not likely to meet the performance objective. Similarly, a calculation of $T_{hi}$ is also made using the table for the same subinterval based on the percentage of false signals to accept that the telemarketer is willing to accept. A signal to accept is generated when the system calculates that an ACD is able to accept calls and that the agents at that ACD will still be able to meet the performance objective.

Calculation of the call load rate, which must be required during any given subinterval in order to achieve the performance objective such as the desired ASA, requires a figure for the number of queueing positions which will be available. It is an aspect of the present invention that an average line-estimation factor is calculated during each service interval. This line-estimation factor when multiplied by the number of agents gives an estimate of the number of lines which are being used by the application under consideration. This line-estimation factor is advantageously calculated in accordance with the present invention by minimizing the mean squared error between the estimated call load as determined by the line-estimation factor and the actual call load which has been experienced in a predetermined number of subintervals in the past.

BRIEF DESCRIPTION OF THE DRAWING

FIG. 5 is a tabular histogram of the successes and failures during a single subinterval which is useful in explaining the present invention.

DETAILED DESCRIPTION OF THE PREFERRED EMBODIMENT

U.S. Pat. No. 5,164,983, issued Nov. 17, 1992 to P. B. Brown et al. for a Telemarketing Complex Performance Management System is hereby incorporated by reference. As pointed out in the Brown et al. patent, the Telemarketer Complex 101 of FIG. 1 consists of a plurality of telecommunications centers (TCs) which may be located in different geographical areas. Typically, each TC includes at least one automatic call distributor (ACD) and one or more "splits/gates" which receive information from the associated ACD at the TO. "Split" or "gate" refers to the group of attendant stations (sometimes called agent terminals) each of which comprises an input/output terminal and/or other display means which allow an attendant at the TC to process selected calls received by the ACD. Each of the TCs is associated with a data center (DC) which typically includes a database containing customer profiles and other information needed to service incoming calls.

Figure 1:
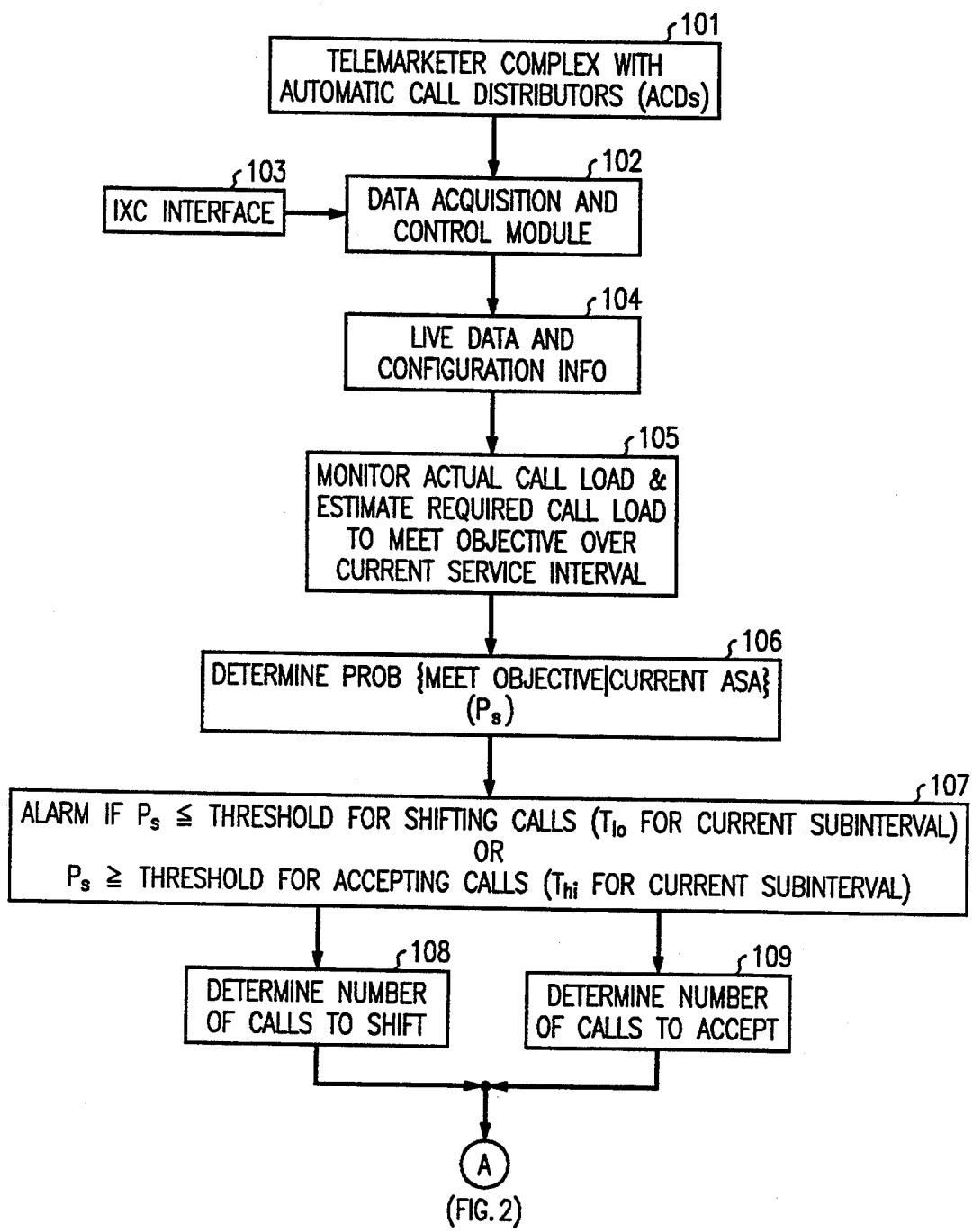
FIGS. 1, 2, and 3 when connected as indicated in the figures provides a flow chart of a process constructed in accordance with the present invention.
Figure 3:
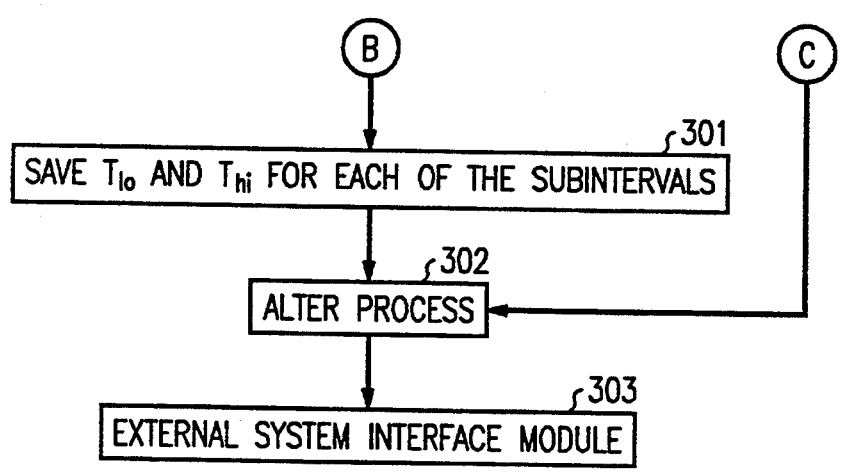

In order to manage and control telemarketing complex 101 and to permit the efficient handling of data therein, telemarketing complex 101 couples data to a data acquisition and control (DAC) module 102 shown in FIG. 1. DAC module 102 is also provided with data from an interexchange carrier (IXC) network 103. A very thorough description of the data collected by DAC module 102 is shown in FIG. 3 of the Brown et al. patent and described in those parts of the patent relating to that figure. In brief, the data relates to ACD performance at each of the TCs and to the telemarketer configuration. This data is all stored in memory as indicated by the live data and configuration information storage block 104 in FIG. 1. This block 104 corresponds directly to the blocks 400 and 410 in FIG. 4 of the Brown et el. patent.

The stored live data and configuration information is available to a module 105 in FIG. 1 wherein the actual call load is monitored and an estimate is made of the required call load which is necessary to meet the objective over the current service interval. Using queueing theory, an equation for the average speed of answer (ASA) can be written in terms of the average staffing level for the current service interval (n), the average rate of service ($\mu$), the call load rate ($\lambda$), and the number of queueing positions (N). See page 104 of the text entitled "Queueing Theory in OR", by E. Page, published 1972 by Crane Russek & Company, Inc. The number of queueing positions, N, can be estimated by using the following equation:

$$N = (T-1)*n$$

where T is the line-estimation factor, and n is the average staffing level. By using the queueing relationship for the ASA and knowing the required ASA to meet the performance objective, the call load rate which is necessary to meet the service objective ($\lambda_{req}$) can be derived. This call load rate can then be used to derive the number of calls, R, that should be offered over the remainder of the service interval if the performance objective is to be met with acceptable certainty by using the following relationship:

$$\lambda_{req} = (NCO_t - NCA_t + R)/(t+\tau)$$

where $NCO_t$ is the number of calls offered up to the current subinterval which has an elapsed time of t since the beginning of the service interval, $NCA_t$ is the number of calls abandoned up to the current subinterval, and $\tau$ is the remaining time in the service interval.

Given the prior distribution of the call load rate for the application at a TC and the number of calls required (R) for the remainder of the service interval ($\tau$), a predictive distribution is built for the number of calls that will arrive during the remainder of the interval based on the assumption that the calls arrive according to a Poisson Process. The predictive distribution, which is a negative binomial, is then used to calculate the probability of receiving, at most, R calls in module 106 of FIG. 1. See pages 284, 236, and 216 of the text "Applied Statistical Decision Theory", by H. Raiffa and R. Schlaifer, published 1961 by Division of Research, Harvard Business School. This probability of receiving, at most, R calls is equal to the probability of meeting the performance objective given the cur rent ASA.

The probability of meeting the performance objective obtained from module 106 is then compared in module 107 to alarm and accept thresholds, $T_{lo}$ and $T_{hi}$, respectively. If $P_s$ calculated in module 106 is less than or equal to threshold $T_{lo}$, module 107 generates an alarm condition which in turn causes a module 108 to determine the number of calls that should be shifted away from the ACD under consideration in order to achieve the performance objective during the service interval. Similarly, if $P_s$ is equal to or greater than threshold $T_{hi}$, module 107 generates an accept condition which in turn causes a module 109 to determine the number of calls which can be accepted from other ACDs.

The modules which have been described thus far are identical in function to those which are described in the above-identified Brown et el, patent. In the embodiment of the invention which was constructed, the service interval was chosen to be 30 minutes and the subintervals were each equal to 3 minutes. Having a subinterval as long as 3 minutes was found to smooth momentary fluctuations in the value of $P_s$ which would be present in subintervals as short as 40 seconds, Accordingly, in the Brown et el. patent, alarming and accepting thresholds had to be pre-defined and chosen for each three minute subinterval by the telemarketing customer. In accordance with the present invention, the alarming and accepting threshold levels, $T_{lo}$ and $T_{hi}$, are calculated by the modules to be described hereinafter in accordance with the telemarketing customer's selection as to how many false alarms and false accept signals that he or she is willing to tolerate.

Figure 2:
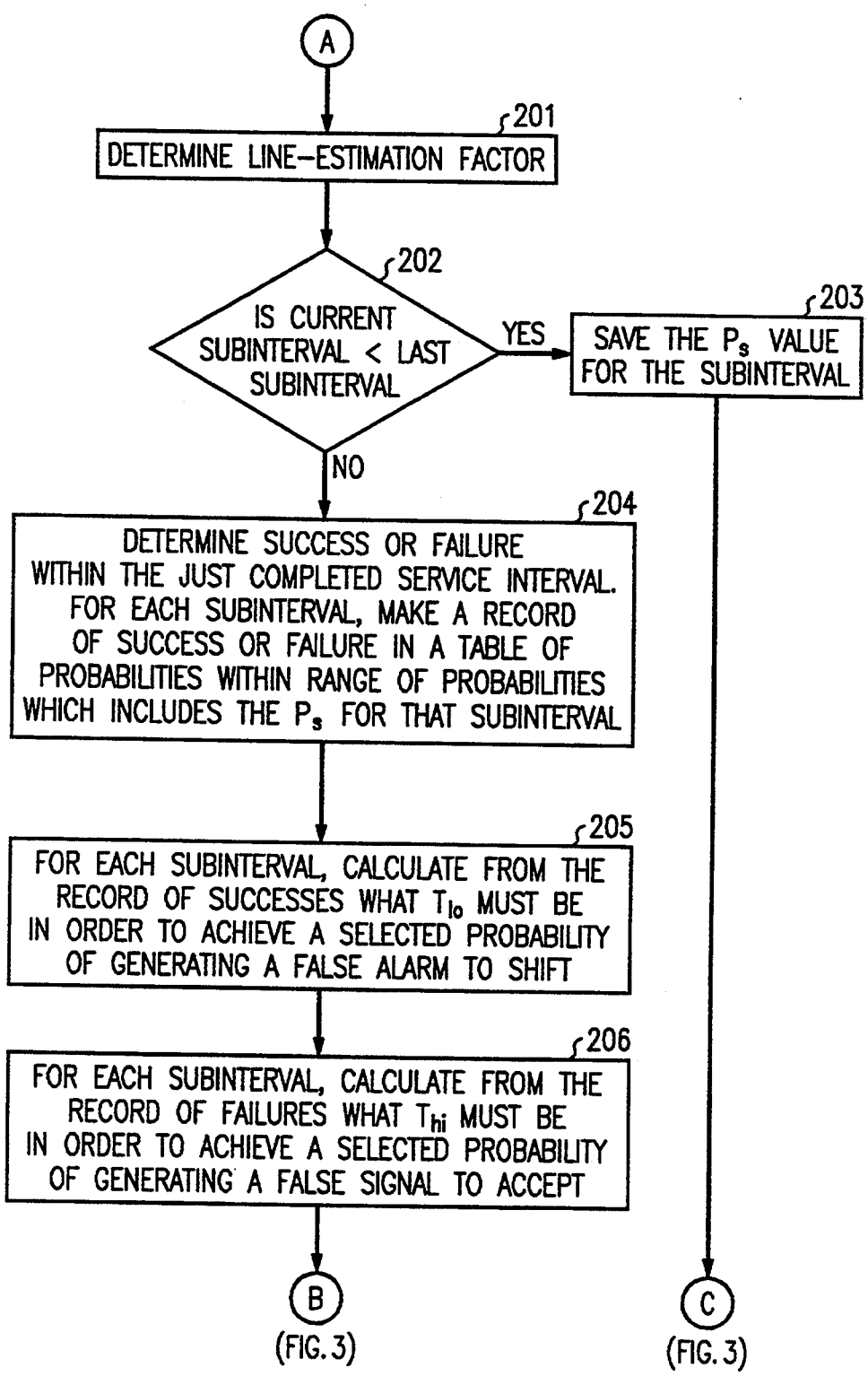

After determining the number of calls to shift, if any, or determining the number of calls to accept, if any, the process proceeds into module 201 of FIG. 2 wherein the line-estimation factor is determined. In the prior art system, this factor was chosen through the study of historical data to have a value of about 1.45. It is an aspect of the present invention that this factor is tweaked during each of the subintervals through a process to be described more fully hereinafter in connection with FIG. 4.

After determining the line-estimation factor, the process proceeds into the decision module 202 which determines whether the current subinterval is less than the last subinterval of the service interval. If the answer is yes, that is, that the process is not working with the last subinterval, the process proceeds into module 203 wherein the value of $P_s$ for the subinterval is saved, and the process continues to the alter process 302 of FIG. 3 which is identical to the alter process described in connection with FIG. 6 of the above-identified Brown et el. patent. In brief, the alter process determines which changes in call processing logic that govern the distribution of call load among the ACDs and/or changes in work force staffing levels at TCs are to be implemented. As in the Brown et el. patent, all change recommendations generated by the alter process are transferred as inputs to an external system interface module 303 in FIG. 3 which provides a display at a telemarketer complex manager's workstation. As in the Brown et el. patent, the external system interface module 303 can also provide outputs to the IXC Interface 103 and/or to a workforce staffing forecaster, as required.

When the last subinterval is detected by decision module 202 in FIG. 2, the process proceeds into module 204 wherein it is first determined whether the telemarketing complex has been successful in achieving the performance objective, that is, whether or not the average speed of answer (ASA) for the service interval is equal to or less than the performance objective. An indication of that success or failure is then placed within a memory table for each of the subintervals at a position in the table that corresponds to the value of $P_s$ obtained during that subinterval. A histogram presentation of such a table is given in FIG. 5. The table shown in FIG. 5 is for the 3 minute subinterval of 360 to 540 seconds from the beginning of the service interval. Similar tables could be presented for each of the subintervals. Each digit "1" within the columns under the headings of "success" and "failure" represent one instance where the $P_s$ for that subinterval had a probability within the range of probabilities shown for the row containing the digit. In the actual process, each digit "1" was also caused to have an indication as to its date of origination thereby permitting the module 301 to periodically cleanse the memory of any storage of information older than one week.

The process then proceeds into module 205 in order to calculate the value of $T_{lo}$ based on the information stored by module 204. As shown in the histogram of FIG. 5, there were six (6) instances for the subinterval under consideration when the value of $P_s$ was less than 20% but the system nevertheless resulted in successfully meeting the performance objective. Since there were a total number of twenty (20) instances when the value of $P_s$ was below 20%, the probability of generating a false alarm is equal to (6/20=) 30%. Accordingly, if the customer has requested that the probability of generating a false alarm be no greater than 30%, the threshold level, $T_{lo}$, can be set at, 20%. Similar computations can be done in module 205 in order to determine the specific threshold level that can satisfy a different customer requirement for the probability of generating false alarms.

The process then proceeds into module 206 in order to calculate the value of $T_{hi}$ based on the information stored by module 204. As also shown in the histogram of FIG. 5, there were three (3) instances for the subinterval under consideration when the value of $P_s$ was greater than 70% but the system nevertheless failed to achieve the performance objective. Since there were a total of nineteen (19) instances greater than 70%, the probability of generating a false accept is equal to (3/19=) 15.8%. Therefore if the customer has requested that the probability of generating a false accept be no greater than say 16%, module 206 will set the accept threshold level, $T_{hi}$, at 70%. Here again, module 206 can do similar computations to determine a different value of $T_{hi}$ in order to meet a different value for the probability of generating a false accept.

The process then proceeds into module 301 of FIG. 3 wherein the values of $T_{lo}$ and $T_{hi}$ which were determined in modules 205 and 206 are saved. As a result, the new values can be used by module 107 in FIG. 1 during the next service interval, and the threshold values of $T_{lo}$ and $T_{hi}$ are constantly reevaluated by the process and updated by changing conditions in order to meet the customers selected probabilities of generating a false alarm and a false accept.

Finally, the process proceeds from module 301 into the alter process 302 and continues in the manner described in the above-identified Brown et al. patent.

Figure 4:
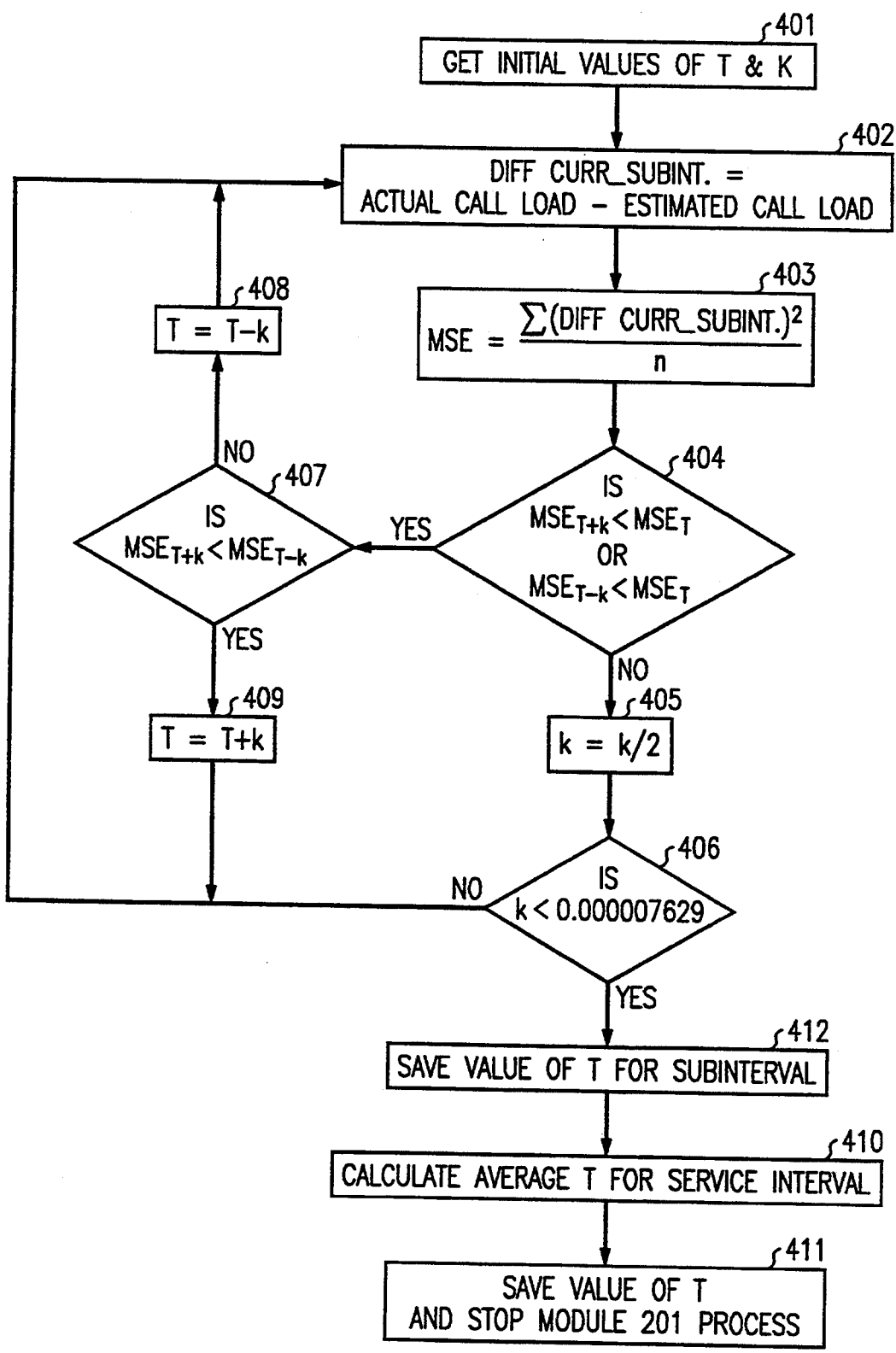
FIG. 4 provides a flow chart of the process used to determine the line-estimation factor.

An expansion of the module 201 which determines the line-estimation factor is given in FIG. 4. The initial values for the line-estimation factor, T, and a parameter k are retrieved from memory in module 401 of FIG. 4. At the beginning of the process, T is set to a value of 1.45 and the parameter k is set each time that the module 401 begins to a value of 1.00. The process then computes, in module 402, for all historical records relating to the current subinterval, the differences between the actual call load and the estimated call load based on line-estimation factors of T, T+k, and T−k. The process then proceeds to module 403 of FIG. 4 wherein a mean squared error is computed for the differences that were obtained using each of the line-estimation factors of T, T+k, and T−k. As a result, three separate mean squared errors are produced for the subinterval, one for each of the line-estimation factors being considered.

Module 404 then considers whether values of (T+k) or (T−k) for the line-estimation factor have produced a lower mean squared error than the value of T. If they have, the process moves into decision module 407, and the value of k is either subtracted from T in module 408 or added to T in module 409 (whichever produces the lower mean squared error), and the process returns to the module 402. In this way the value of the line-estimation factor is moved towards a value which is likely to achieve a lower mean squared error in a new calculation of the differences. If on the other hand, the lowest mean squared error was produced in module 403 by the current value of T, decision module 404 moves the process into module 405 wherein the value of k is halved. If the new value of k is not less than 0.000007629, the decision module 406 returns the process to the calculation module 402 with a reduced value of k. This reiterative process of calculating the mean squared errors is stopped when the value of k is less than the amount indicated in module 406, the process then moves into module 412 where the value of T for the current subinterval is stored in memory.

Finally, an average value of T is calculated in module 410 using the values of T for each subinterval of the service interval. The average value of T is then stored in memory by module 411, and the process relating to module 201 of FIG. 2 is stopped.

What has been described hereinabove is merely an illustrative embodiment of the present invention. Numerous departures may be made by those skilled in the art without departing from the spirit and scope of the present invention, For example, the sequence of determining the threshold levels of $T_{lo}$ and $T_{hi}$ can obviously be interchanged without modifying the effectiveness of the process. In addition, the invention could be used to optimize system performance with respect to criteria other than the ASA. It should also be obvious to those skilled in the art that range of probability values used in the histogram of FIG. 5 could be larger or smaller than the 5% range used in the above-described embodiment.

What is claimed is:

1. A method for managing a telemarketing complex having automatic call distributors and means for collecting data with respect to said automatic call distributors during each subinterval of a service interval, said method comprising the steps of determining the probability during each subinterval of having each one of said automatic call distributors achieve a predetermined performance objective at the end of said service interval, comparing said probability to a threshold level for shifting calls and to a threshold level for accepting calls, determining the number of calls to shift and the number of calls to accept based on said comparison to said threshold levels, determining success or failure in achieving said performance objective at the end of said service interval and storing a record of a success or failure along with the associated probability for each of the subintervals within said service interval thereby adding to an historical record of successes and failures for each of said subintervals, and automatically calculating said threshold for shifting calls and said threshold for accepting calls for each of said subintervals based on said record of successes and failures.

2. A method of managing a telemarketing system as defined in claim 1 wherein the method further includes a step of determining a line-estimation factor for each one of said automatic call distributors which can be used to estimate the call load at said each one of said automatic call distributors.

* * * * *